(12) United States Patent
Kueblbeck et al.

(10) Patent No.: US 6,701,276 B2
(45) Date of Patent: Mar. 2, 2004

(54) METHOD FOR GENERATING AN ACTIVATING ALGORITHM FOR ROLLOVER DETECTION FOR SAFETY-RELATED DEVICES IN AUTOMOTIVE VEHICLES

(75) Inventors: Hermann Kueblbeck, Schrobenhausen (DE); Ernst Rottenkolber, Petershausen (DE); Peter Steiner, Schrobenhausen (DE); Helmut Steurer, Gerolsbach-Junkenhofen (DE); Peter Weidel, Pfaffenhofen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 142 days.

(21) Appl. No.: 09/864,087

(22) Filed: May 22, 2001

(65) Prior Publication Data

US 2002/0019719 A1 Feb. 14, 2002

(30) Foreign Application Priority Data

May 22, 2000 (DE) .......................... 100 25 259

(51) Int. Cl.⁷ ............................................. B60R 21/13
(52) U.S. Cl. ........................ 702/145; 702/151; 701/36; 701/45
(58) Field of Search .............. 702/45–47, 75, 702/76, 38, 113–115, 141, 142, 145–151, 182, 183, 188, 189, 190, 193, 197; 701/36–49

(56) References Cited

U.S. PATENT DOCUMENTS

| | | | | |
|---|---|---|---|---|
| 4,784,237 A | * | 11/1988 | Condne et al. ............. 180/268 |
| 5,436,838 A | * | 7/1995 | Miyamori ..................... 701/46 |
| 5,610,575 A | * | 3/1997 | Gioutsos ..................... 340/429 |
| 5,996,409 A | | 12/1999 | Funk et al. ............... 73/504.04 |
| 6,002,975 A | | 12/1999 | Schiffmann et al. |
| 6,157,880 A | * | 12/2000 | de Mersseman et al. ..... 701/45 |
| 6,292,759 B1 | * | 9/2001 | Schiffmann .................. 702/151 |
| 6,308,115 B1 | * | 10/2001 | Yamaguchi et al. ........... 701/1 |
| 6,315,074 B1 | * | 11/2001 | Achhammer et al. ....... 180/282 |
| 6,332,104 B1 | * | 12/2001 | Brown et al. .................. 701/1 |
| 6,502,023 B1 | * | 12/2002 | Fukada ........................ 701/38 |

FOREIGN PATENT DOCUMENTS

| | | |
|---|---|---|
| EP | 0261152 | 9/1987 |
| EP | 0430813 | 6/1991 |
| EP | 1028037 | 8/2000 |
| JP | 07164985 | * 6/1995 ........... B60R/21/13 |

OTHER PUBLICATIONS

English Abstract of DE 196 32 363, published Jan. 15, 1998.

* cited by examiner

Primary Examiner—Marc S. Hoff
Assistant Examiner—Jeffrey R. West
(74) Attorney, Agent, or Firm—W. F. Fasse; W. G. Fasse

(57) ABSTRACT

An activating algorithm is generated for rollover detection for safety-related devices in automotive vehicles. First, a theoretical characteristic rollover curve, adapted to the respective vehicle, is assumed. This theoretical rollover curve is approximated with the aid of low pass filter functions to specific cutoff frequencies and trigger thresholds respectively. These cutoff frequencies and trigger thresholds are adapted to the rollover scenarios to be detected. The sensor signals generated by an angular rate sensor for sensing the rotational velocity of the rolling motion, are processed and evaluated by these low pass filter functions for activating a safety device, if necessary. The low pass filter functions provide a rollover curve which is an approximation of the theoretical rollover curve.

38 Claims, 9 Drawing Sheets

METHOD FOR GENERATING AN ACTIVATING ALGORITHM FOR ROLLOVER DETECTION FOR SAFETY-RELATED DEVICES IN AUTOMOTIVE VEHICLES

BACKGROUND

1. Field of the Invention

The invention concerns a method for generating an activating algorithm processing the sensor signal of an angular rate sensor provided within the safety system of a motor vehicle, by means of which an activation decision for activating at least one safety device of the safety system is taken in relation to the sensor signal, and with the sensor signal representing a measure for the rotational velocity of the rolling motion occurring when a rollover is imminent. Furthermore this invention also concerns a safety system for motor vehicles with at least one safety device, which safety system utilizes this activating algorithm. Here, in connection with rollover events, the safety devices in question are mainly roll bars, seat-belt tensioners, and side airbags.

2. Description of the Related Technology

From EP 0 430 813 B1 a safety system for motor vehicles is known which features an electronic arrangement for controlling at least one safety device in the event of a motor vehicle rolling over. The safety system comprises a gyrometer (angular rate or gyro sensor), which measures the rotational velocity of the rolling motion, and acceleration meters, with the electronic arrangement processing the signals coming from the gyrometer and the acceleration sensors in order to control the activation of the safety device. Here, the sensor signals are evaluated by integration for a specified period of time. In order to avoid an overflow of the integration, the ratio of the transverse acceleration to the vertical acceleration is additionally calculated, and if a specified threshold value is exceeded, integration is released.

The disadvantage of the activating algorithm used in this safety system is above all that, in order to avoid an overflow of the integration, further signals are required in addition to the signals of the angular rate sensor, namely acceleration sensor signals; these only meet the purpose to be able to evaluate the angular rate sensor signals, but entail high manufacturing costs for the total system.

SUMMARY OF THE INVENTION

The object of the present invention is to provide a method for generating an activating algorithm processing the sensor signal of an angular rate sensor provided within the safety system of a motor vehicle, by means of which an activation decision for activating at least one safety device of the safety system is taken in relation to the sensor signal, and with the sensor signal representing a measure for the rotational velocity of the rolling motion occurring when a rollover is imminent, and which does not feature the above-mentioned disadvantages, that is, it does not require signals from further expensive acceleration sensors for evaluating the angular rate sensor signals.

According to the present invention, this object is achieved according to the following steps:

a) generating a theoretical characteristic rollover curve as follows:

$$\alpha_{th}(\omega) = -(\alpha_{tip}/\omega_{lim})\omega + \alpha_{tip}, \quad \omega \geq 0 \quad \text{Equation (1)}$$

where $\omega$ corresponds to the initial rotational velocity of a rolling motion of the vehicle, and $\alpha_{th}(\omega)$ represents the inclination angle of the vehicle, the constants $\alpha_{tip}$ and $\omega_{lim}$ are determined in relation to the actual vehicle and state the static tip angle of the vehicle, which —if exceeded—causes the vehicle to tip over, and the rotational velocity range, at which with $\omega \geq \omega_{lim}$ a rollover of the vehicle will occur, and the range $B_{th}$ which with $(\omega, \alpha)$—combinations with $|\alpha| \geq \alpha_{th}(|\omega|)$ wherein $\alpha$ and $\omega$ are real values, represents the associated rollover risk range where a positive activation decision is expected, and b) generating an activation algorithm by approximating the characteristic rollover curve of Equation (1) in the first quadrant of a coordinate system with at least two low pass filter functions ($Y_{1,n}$, n=1,2, . . . ; $Y_{2,n}$, n=1,2, . . . ) each having at least one activation threshold ($S_1$, $S_2$), by the limit frequencies $f_{g1}$, $f_{g2}$) of the two low pass filter functions ($Y_{1,n}$, n=1,2, . . . ; $Y_{2,n}$, n=1,2, . . . ) and determining said activation thresholds ($S_1$, $S_2$) such that for the range $B_{F2}$ of the $(|\omega|, Y_{1,n}(\omega))$ value pairs and the range $B_{F2}$ of the $(|\omega|, Y_{2,n}(\omega))$ value pairs with $$|Y_{1,n}(\omega)| > S_1, \text{ and } |Y_{2,n}(\omega)| > S_2 \quad \text{Equation (2)}$$

and wherein $Y_{1,n}(\omega)$ and $Y_{2,n}(\omega)$ are real values, and $B_{F1} \subset B_{th}$ and $B_{F2} \subset B_{th}$ are satisfied.

Due to the fact that with the method according to the invention an activating algorithm is generated, which evaluates with low pass filter functions the sensor signals generated by the angular rate sensor, the disadvantages occurring when integrators are used have been avoided in a surprisingly simple fashion as the measures required to avoid an overflow—in particular, the additional sensors specified in the state of the art—are now no longer required.

The method according to the invention uses a theoretical characteristic rollover curve as a characteristic curve model for generating the activating algorithm in accordance with the invention. The activation algorithm satisfies equation (1) set forth above. The $\omega$-$\alpha$-graph 1 of the equation (1) is shown in FIG. 1, wherein $|\omega|$ represents the rotational velocity value of the rolling motion occurring in the x direction or longitudinal axis of the vehicle if a vehicle rollover is imminent and wherein $|\alpha|$ represents the inclination angle value in the y direction or cross-axis of the vehicle. The $\omega$-$\alpha$ graph subdivides the first quadrant of a coordinate system into two areas which on the one hand concern vehicle conditions with $\omega$-$\alpha$-combinations that are to lead to the activation of a safety device, i.e. "fire" scenarios, and, on the other hand, "no-fire" scenarios whose $\omega$-$\alpha$-combinations are not to lead to the activation of the safety device. The $\omega_{lim}$, 0-combination or 0-$\alpha_{tip}$—combination represents a limit condition of a vehicle with a rotational velocity $\omega_{lim}$ in the x direction and an inclination angle of 0° or with a rotational velocity 0 and an inclination angle (static tip angle) $\alpha_{tip}$ that leads to a rollover. These parameters are vehicle specific and, therefore, need to be determined for each vehicle type.

In addition to the theoretical characteristic curve 1, FIG. 1 shows three rollover scenarios with the curves 2, 3, and 4. Curve 2 shows the course of a rollover starting with a high initial velocity. Curve 3 shows a situation where the vehicle is driven onto a screwramp with a following rollover. Curve 4 shows a quasi-static rollover where the vehicle reaches the static tip angle with an angular velocity of almost zero and then rolls over.

The low pass filter functions can be generated as digital filters of the 1st magnitude by means of a computer where the filter algorithm consists of linear difference equations with constant coefficients, and where recursive as well as non-recursive difference equations can be used.

A filter algorithm for the first and second low pass filter function $Y_{1,n}$, n=1,2, ... and $Y_{2,n}$, n=1,2, ... of a recursive filter of the first magnitude here takes on the following form:

$$Y_{1,n} = d_1 Y_{1,n-1} + c_1 X_{n-1}, n=1,2 \ldots \text{ or}$$

$$Y_{2,n} = d_2 Y_{2,n-1} + c_2 X_{n-1}, n=1,2 \ldots$$

with $X_n$ representing the digitized input sequence of the rotational velocity ω, and $Y_{1,n}$ or $Y_{2,n}$ representing the corresponding output sequence, that is the inclination angle α in binary representation. The coefficients of the filter algorithm are determined in accordance with method step (b) by approximation and defining the limit frequencies and the trigger thresholds such that condition (2) is met.

The cutoff frequency (=limit frequency) is defined respectively according to the initial rotational velocity, so that an initially high rotational velocity corresponding to a high initial rotation energy leads to a high cutoff frequency with an appropriately adapted trigger or activation threshold, that is, to a trigger threshold which is also high. A low cutoff frequency is defined for a low initial rotational velocity, which corresponds to a low initial rotation energy, with an appropriately adapted trigger or activation threshold, that is, a trigger threshold which is also low. The values of the cutoff frequency, as well as the relevant trigger threshold, depend on the respective vehicle type as well as on the fitted safety device in the vehicle (roll bar, seat-belt tensioner, side airbag) to be triggered in the event of a crash, and therefore need to be specifically adapted to each application case in order to ensure an optimum and safe trigger behavior. The terms "trigger" and "activation" or "trigger threshold" and "activation threshold" are used herein synonymously.

For the approximation of a characteristic rollover curve in accordance with equation (1), a step function ω(t) will preferably be processed as the input sequence for the low pass filter functions; and the resulting ω-α-graph is compared with the graph of the rollover characteristic, and, if necessary, an adaptation of limit frequencies and threshold values is effected.

In addition, the activating algorithm is tested by means of sensor signatures obtained from earlier vehicle tests, i.e. real sensor signatures, and/or such sensor signatures simulated within the framework of a suitable simulation environment. Using these simulation results, the trigger characteristic in the ω-α-graph is evaluated, and, if necessary, an adaptation of the limit frequencies and the associated trigger thresholds is effected.

Using such a method in accordance with the invention to generate an activating algorithm, the trigger behavior can be adapted individually to each vehicle type without having first to carry out costly drive tests.

In a further advantageous embodiment of the method according to the invention, additional signals of further sensors are processed by the activating algorithm, hereinafter designated as extended activating algorithm, with these sensors detecting the vehicle-condition-specific parameters indicating stability, in particular vertical acceleration, lateral acceleration, and inclination angle. Using these additional data, the trigger threshold values can be adapted dynamically to the respective vehicle condition. Thus, for example, the initial value of the inclination angle of the vehicle, or its stability due to the acceleration value in z direction can be taken into account for the activation decision. This is to achieve, in relation to the detected vehicle specific parameters, an even better differentiation according to fire scenarios—i.e. vehicle conditions that lead to a safety device being activated—and no-fire-scenarios.

The activating algorithm generated by the method according to the invention can be used to advantage within a safety system for motor vehicles. Here, this activating algorithm is implemented in the control unit for the safety system, which features an angular rate sensor for detecting the rotational velocity of the rolling motion of the vehicle, and at least one safety device. The activating algorithm generated according to the invention can be implemented in analog fashion, that is, with the corresponding analog filters, or by means of software using a processor in the control unit of the safety system.<<

The limit frequencies and the trigger thresholds are defined such that the low pass filter function for the high rotation velocities features the higher cutoff frequency and a correspondingly higher trigger threshold whilst the low pass filter function for the lower rotation velocities also requires a correspondingly lower cutoff frequency as well as a lower trigger threshold. Relevant cutoff frequency $f_{g2}$ values for a slow rollover are below 5 Hz for $f_{g2}$. Relevant cutoff frequency $f_{g1}$ values for a fast rollover are below 10 Hz for $f_{g1}$.

Thus, in accordance with a particularly preferred example embodiment, a first low pass filter function features a high cutoff frequency $f_{g1}<7$ Hz and a correspondingly high trigger threshold value in order to detect a fast rollover with a high initial rotation energy, whilst the. The second low pass filter function features a cutoff frequency of $f_{g2}<3$ Hz with a correspondingly adapted trigger threshold value in order to detect a slow rollover with a lower rotation energy. In the event of fast rollovers in particular, this provides for a fast activation of the safety device. Preferably, this embodiment can be provided with a third low pass filter function, by means of which slow rollovers are detected and which thus features a cutoff frequency $f_{g3}<0.5$ Hz with an appropriately adapted trigger threshold value. If three low pass filter functions are used, it is possible to achieve an optimum differentiation according to rollover scenarios, and, also according to so-called no-fire scenarios, i.e. vehicle conditions that do not lead to a safety device being activated.

Furthermore, in an advantageous embodiment the signals generated by the angular rate sensor can first be fed into a high pass filter before being processed by the low pass filter functions. In advantageous fashion, this measure reduces the zero point imprecision of the angular rate sensor so that, in particular if several low pass filter functions are used, even rollover events with very low angular rates can be detected.

In a further preferred embodiment of the safety system, the extended activating algorithm is implemented in its control system in order to evaluate vehicle-specific parameters in addition to the angular rate. Preferably, using an acceleration sensor, the vertical acceleration of a motor vehicle is detected and compared with at least one adaptation threshold; and, if this adaptation threshold is exceeded, or if the actual value falls below this threshold, the trigger threshold values will be increased or decreased. Thus, the signal of such an acceleration sensor is not required for the evaluation of the angular rate sensor signal—as provided for by the state of the art—but for the dynamic adaptation of the trigger thresholds as this signal provides additional information regarding the stability of the vehicle and thus carries out some kind of a plausibility check, for example with regard to a high initial rotational velocity value. That is, that for a high value of the z acceleration signal the trigger thresholds can be set higher in spite of a high initial rotational velocity, whilst a low signal indicates a low driving stability of the vehicle and thus requires that a low trigger threshold is set. In advantageous fashion, this achieves a faster activation in the event of slow rollovers, and, at the same time, in the event of extreme situations hardly ever occurring in normal driving conditions, such as e.g. in extremely steep turns, prevents such activation.

Instead of such an acceleration sensor, it is also possible to use an inclination sensor. The adaptation of the trigger thresholds is effected such that, for a large inclination angle, a low trigger threshold is set, as the driving stability will then be low; however, for a lower inclination angle, a higher trigger threshold is to be provided. In addition, the inclination sensor provides the advantage that the sign of the inclination angle can be stated. This allows the thresholds to be adapted asymmetrically, that is, if the angular rate and the inclination angle have the same sign, then a lower trigger threshold value is set, whilst if the signs are different a high trigger threshold value is set.

As further vehicle specific parameters, in another preferred embodiment of the safety system according to the invention, the vertical acceleration as well as the lateral acceleration can be detected, with a dynamic adaptation of the trigger threshold values being effected by means of the quotient from lateral acceleration and vertical acceleration, on the one hand, by setting a low trigger threshold if a high value of this quotient indicates an instable vehicle condition, and, on the other hand, direct and immediate activation of the safety device if the value of this quotient exceeds a predefined fixed quotient threshold. With this type of embodiment, an improved differentiation according to fire scenarios and no-fire scenarios can be achieved.

In a further preferred embodiment, instead of an acceleration transducer for detecting the lateral acceleration, an inclination sensor can be used to measure the inclination angle, with the dynamic trigger threshold values being set by means of the vehicle condition characterizing the vertical acceleration and the rotational velocity. In particular, the sensor values of the inclination sensor can be used to compare the measured values with a tip angle corresponding to the static tip angle of the motor vehicle, in order to trigger directly the safety device if the static tip angle is exceeded. This ensures that if such a rollover scenario occurs, i.e. in the event of a static rollover, the safety device is always activated.

Furthermore, in another advantageous embodiment, the plausibility of the inclination angle can be evaluated by means of the vehicle condition characterizing the vertical acceleration and the rotational velocity, so that, for a plausible inclination angle value, this is set as the actual current value of the inclination angle, with this value that is evaluated as being plausible being compared at the same time with a tip threshold value corresponding to the static tip angle of the motor vehicle and the safety device being activated if the tip threshold value exceeds the amount of this value. The plausibility check is advantageous therefore as it allows driving situations that represent no-fire scenarios, such as when driving through a steep turn, to be easily detected, whilst at the same time for extremely slow rollovers—so-called quasi-static rollovers—where trigger threshold values are not exceeded—activation is effected if the tip threshold value is exceeded.

However, if there is no plausible inclination angle value, the change in the inclination angle which occurs during motor vehicle operation is determined by means of an integration of the rotational velocity, and then added to the start angle; the sum is then set as the current inclination angle.

Finally, in dependence of the preset current inclination angle value, the trigger threshold values can be adapted to the vehicle condition characterized by this inclination angle.

BRIEF DESCRIPTION OF THE DRAWINGS

Embodiments of safety systems with an activating algorithm, which is generated by the method according to the invention, are described below in detail and illustrated by the figures.

The figures below show.

DETAILED DESCRIPTION OF PREFERRED EXAMPLE EMBODIMENTS AND OF THE BEST MODE OF THE INVENTION

Figure 1:
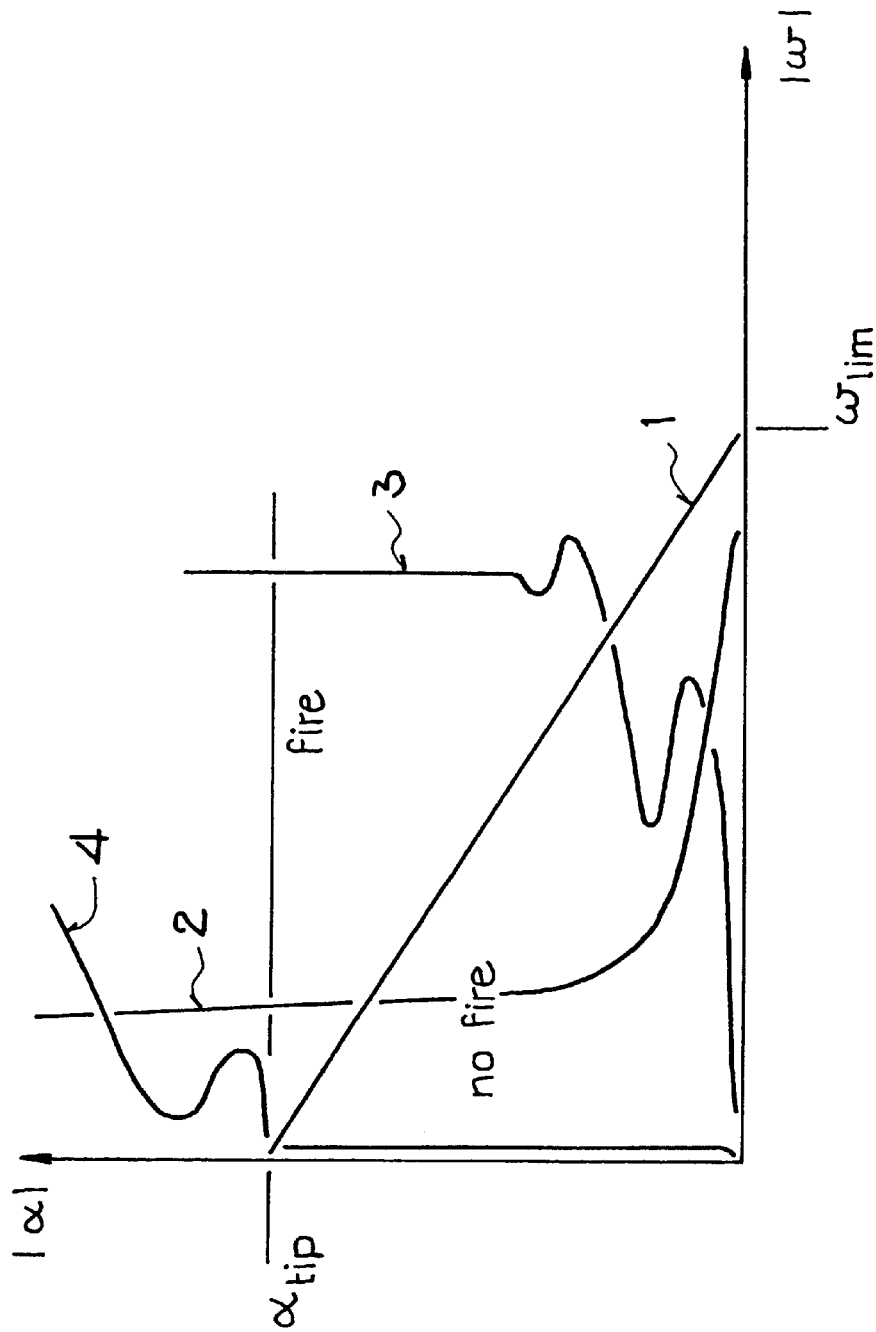
FIG. 1: $\omega$-$\alpha$-graph of equation (1) as the theoretical characteristic rollover curve.

FIG. 1 has been described above. Therefore the description of FIG. 1 is not repeated here.

Figure 2:
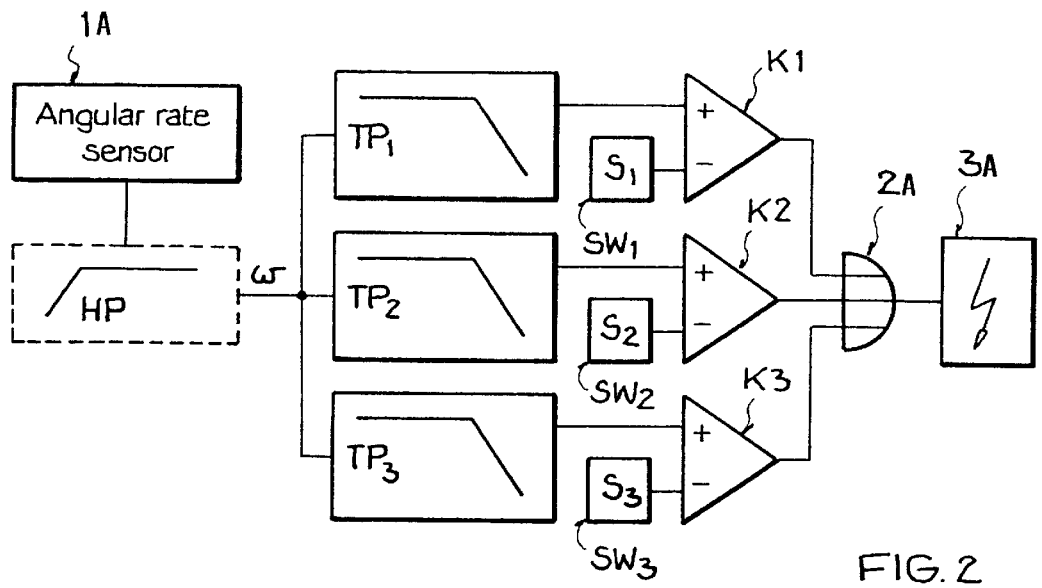
FIG. 2: a block diagram of a safety system with an activating algorithm generated according to the invention, which features an angular rate sensor and three low pass filter functions for the evaluation of the sensor signals.

As a first embodiment of the safety system according to the invention, FIG. 2 shows an arrangement comprising an angular rate sensor or gyrosensor 1A, which generates a signal that is proportional to the angular velocity $\omega_x$ (angular rate) around the longitudinal axis (x axis) of a vehicle; this signal is fed to a high pass filter HP, which can be used optionally, and to the low pass filters $TP_1$, $TP_2$, and $TP_3$ of the $1^{st}$ magnitude, to which the filtered signals $\omega$ of the high pass filter HP are passed directly for evaluation.

The output signals of the low pass filters $TP_1$, $TP_2$, or $TP_3$ are respectively fed to the non-inverting inputs of the comparators $K_1$, $K_2$, or $K_3$ that compare the filtered signals with the trigger threshold values $S_1$, $S_2$, or $S_3$ applied to the inverting inputs of the comparators $K_1$, $K_2$, or $K_3$, with these triggger threshold values being generated by the threshold value generating units $SW_i$, i=1, 2, 3.

As soon as one of the filtered signals on the comparators $K_1$, $K_2$, or $K_3$ exceeds one of the trigger threshold values $S_i$, with i=1, 2, 3, the H signal generated by the respective comparator $K_i$—or by several comparators—is fed via an OR gate 2A to an ignition stage 3A for triggering a safety device not shown.

Figure 4:
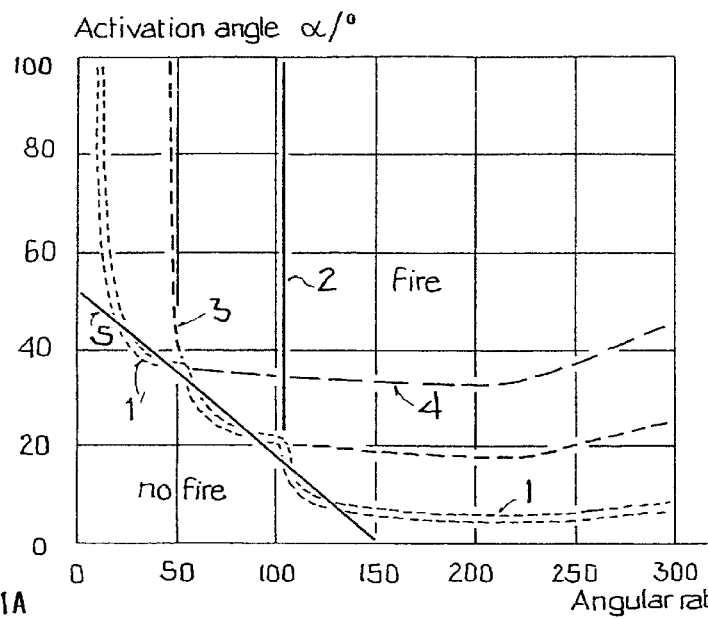

The units shown in FIG. 2—with the exception of angular rate senor 1A and the ignition stage 3A for activating a safety device—are implemented by an activating algorithm according to the invention, using a microprocessor in the control unit of the safety system, and with the activating algorithm having the corresponding low pass filter functions $Y_{1,n}, Y_{2,n}, Y_{3,n}, n=1,2, \ldots$. The three low pass filters $TP_1$, $TP_2$, and $TP_3$ are known low pass filters implemented as digital filters, for example as IIR filter of the $1^{st}$ magnitude that differ from one another in relation to the various different cutoff frequency values $f_{gi}$, i=1, 2, 3 and trigger threshold values $S_i$, i=1, 2, 3. The cutoff frequencies $f_{gi}$ and trigger thresholds $S_i$ are determined such that the resulting characteristic trigger curve approximates the theoretical characteristic rollover curve in accordance with equation (1), whose parameters $\omega_{lim}$ and $\alpha_{tip}$ are defined on a vehicle-specific basis. FIG. 4 shows the characteristic trigger curve as an ω-α-graph 1' of the implemented activating algorithm as well as the activation behavior of the three individual branches in form of the ω-α-graphs 2', 3', and 4'. A theoretical characteristic rollover curve 5 is also shown in FIG. 4. Characteristic curve 5 in FIG. 4 corresponds to the theoretical rollover curve or characteristic 1 in FIG. 1.

The fire-range that is, the range where a triggering of the safety device is desired, is defined by those ω-α-combinations, to which—with the resulting characteristic triggering curve 1 or 5 as a function: α(ω)—the following applies: $\alpha \geq \alpha(\omega)$. The range of those ω-α-combinations with $\alpha < \alpha(\omega)$ represents the no-fire range, where the safety device is not triggered. This range extends below curve or straight line 5 in FIG. 4.

The first triggering ranch with the first low pass filter $TP_1$ and the associated trigger threshold $S_1$ corresponds to the ω-α-graph 2', in FIG. 4 with $f_{g1}=4.5$ Hz being defined as cutoff frequency and $S_1$ about 100°/s as the trigger threshold. This graph 2' is used for fast triggering at a high angular rate $\omega_x$, namely for ω values greater than 100°/s. Curve or graph 2' in FIG. 4 also shows that the lower threshold value, up to which there will be no triggering is relatively high—namely at an angular rate of the vehicle around its x axis of approximately 100°/s as shown in FIG. 4. The other two triggering branches 3' and 4' in FIG. 4 are adapted to rollover scenarios with an angular rate below 100°/s, which occur more frequently relative to the above-mentioned situations. The curve or graph 4' of the third triggering branch which corresponds to the third low pass filter $TP_3$ with associated threshold value circuit $SW_3$, with the lowest cutoff frequency $f_{g3}$ of 0.06 Hz and a triggering threshold value $S_3$ of about 11°/s, triggers in the event of slow rollovers, with even the lower limit below which there will be no triggering having a low value, namely a vehicle angular rate value of approximately 11°/s. The curve or graph 2' covers the intermediate range and this includes typical rollover scenarios. The associated cutoff frequency $f_{g2}$ is 0.5 Hz, the associated trigger threshold value $S_2$ is about 47°/s, see FIG. 4. The specified values represent values that have already been optimized and which were determined by means of simulated sensor signatures, or the use of real crash data, and finally by concrete driving and crash trials to provide real measured values. The aim is to define these parameters such that the greatest possible sensitivity with regard to all fire scenarios above curve 5 in FIG. 4 is achieved, whilst at the same time ensuring that there will be no triggering or activation in no-fire scenarios below curve 5 in FIG. 4.

If one considers the triggering behavior of the overall system by means of curve or graph 1', it can be seen that the lower limit of $\omega_x$, where there will no longer be any triggering, corresponds to the limit of the third triggering branch (in line with curve or graph 4' of FIG. 4). In addition, for an angular rate above 230°/s the trigger angle α increases linearly as seen in FIG. 4, wherein the dashed line graph 4' starts bending upwardly at about 230°/s. This is caused by the limited measurement range of the angular sensor 1A shown for example in FIG. 2.

The embodiment shown in FIG. 2 illustrates a rollover detection with the help of the activating algorithm according to the invention. This embodiment requires three low pass filter functions $TP_1$, $TP_2$, $TP_3$; however, in response to the actual trigger behavior requirements, it is possible to extend this activating algorithm to more than three low pass filter functions; in that case it is possible to select smaller spacings in between the cutoff frequencies.

As already described above, the high pass filter HP shown in FIG. 2 can be used optionally—irrespective of how many low pass filter functions have been selected. The purpose of this high pass filter function HP is to eliminate a low frequency drift of the angular rate sensor signal, caused e.g. by temperature fluctuations, and thus to stabilize the angular rate sensor signal. If necessary, it may be possible to do without this high pass filter function, if the temperature fluctuations only cause a minor drift.

Figure 3:
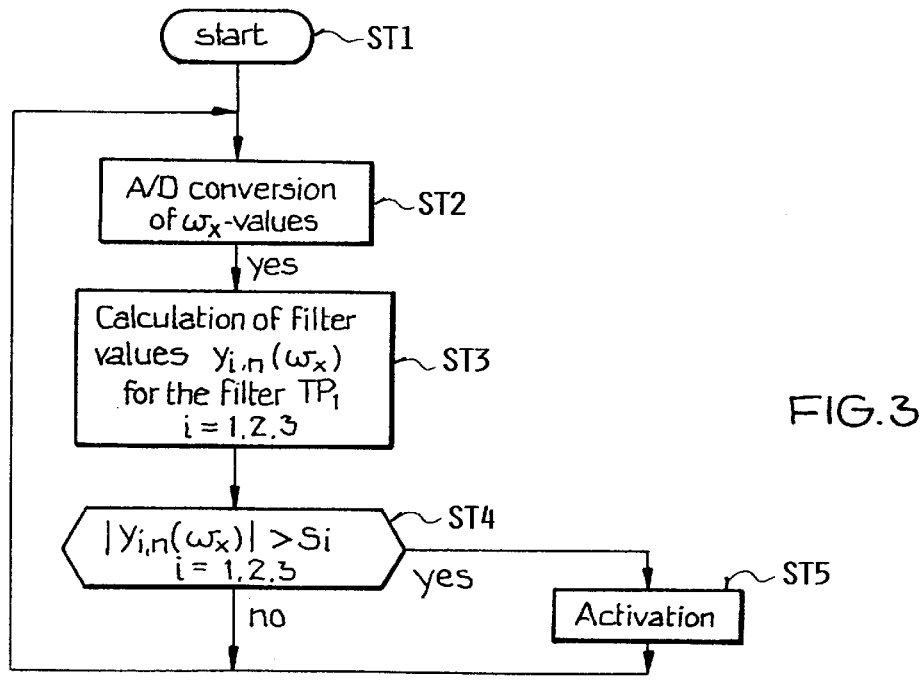
FIG. 3: a flow chart for the software implementation of the safety system according to FIG. 2, FIG. 4: an $\omega$-$\alpha$-graph of the activating algorithm implemented in the safety system according to FIG. 2 with the activation behavior of the individual activation branches.

FIG. 3 illustrates in a flow chart the processing steps to be executed by a microprocessor or central processing unit (CPU) in the case of a software implementation. According to this flow chart, following start-up (step ST1) the angular rate sensor signals are first digitized as $\omega_x$-values in step ST2. Next, in step ST3, the filter values of $\omega Fil1_{out}$, $\omega Fil2_{out}$, and $\omega Fil3_{out}$ of the filters $TP_1$, $TP_2$, and $TP_3$ are calculated and then a comparison with the trigger threshold values $S_1$, $S_2$, and $S_3$ will be carried out in (step ST4). If one of these trigger threshold values $S_1$, $S_2$, or $S_3$ is exceeded, a safety device will be triggered in step ST5, e.g. a seat-belt tensioner, a side airbag, or a rollover bar. If all filtered $\omega_x$-values remain below these trigger threshold values, the method recommences with step ST2.

Figure 5:
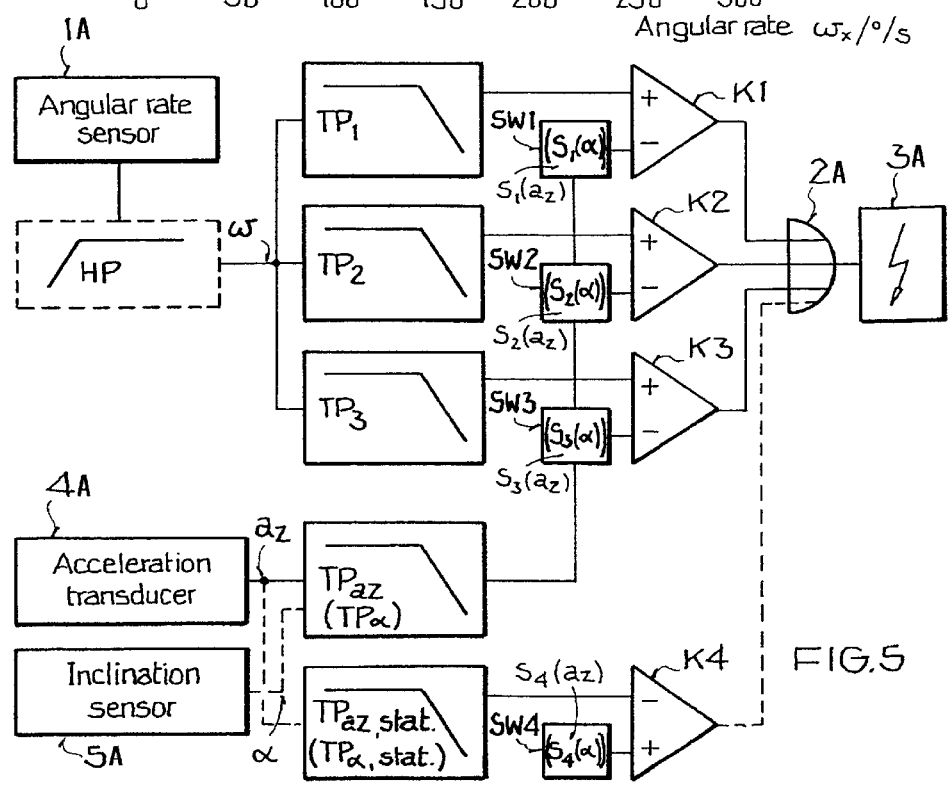
FIG. 5: a safety system according to FIG. 1 with an additional acceleration transducer or sensor in z direction or an additional inclination sensor.

An improvement of the trigger behavior is achieved by an embodiment according to FIG. 5, in contrast to an embodiment according to FIG. 2, by using an additional acceleration sensor 4A in z direction whose signals are processed as $a_x$-values by a low pass filter function that is shown as low pass filter $TP_{az1}$ in FIG. 5. This additional information from the acceleration sensor 4A is used, on the one hand, to carry out a dynamic adaptation of the trigger threshold values $S_i$ (i=1, 2, 3) such that triggering will be faster for fast rollovers and earlier for slow rollovers, and, on the other hand, activation is prevented in the event of extreme situations hardly ever occurring in normal driving conditions, such as e.g. in extremely steep turns. In this regard, the acceleration signal $a_z$ supplies additional information on the stability of the vehicle. For an $a_x$ value of at least 1 g (=gravitational acceleration), a stable vehicle condition can be assumed. In such a case, the $a_z$ values are processed by the low pass filter function $TP_{az}$ and are used to adapt the trigger threshold values $S_i(\alpha)$ (i=1, 2, 3) to this vehicle condition by increasing the trigger threshold values. But in reverse, if the $a_z$ value is very low a less stable driving condition of the vehicle must be assumed, with the consequence that the trigger threshold values are lowered. Therefore, the trigger threshold values $S_i(\alpha)$ represent a function $f_i(zlFil_{out})$ of the filtered acceleration signal $a_z$ which thus supplies a redundant information in addition to the information from the $\omega_x$ values with regard to the actual vehicle position.

With this dynamic threshold value adaptation, extreme situations can be reliably detected even with regard to the actual vehicle position. On the one hand, such a situation involves driving through a steep turn. On the other hand, driving along a screw ramp with subsequent rollover also corresponds to such a situation. The first-mentioned situation represents a no-fire scenario, the last-mentioned situation is a fire scenario. Detection and correct interpretation of these situations is made more difficult by the fact that the initial behavior of the $a_z$ measured value is identical for the two situations, namely, a fast increase to a high value $\alpha_z$ with $\alpha_z > 1$. Then the $a_z$-measured value drops down to a low value with $\alpha_z << 1$ at the screw ramp, as the vehicle passes into a weightless condition or a lateral condition similar to weightlessness, whilst in another case the $a_z$ measured value remains on a positive g value with $\alpha_z > 1$, which is almost constant whilst driving into a steep turn. The dynamic adaptation is now effected by adapting the threshold values to the $a_z$-value, that is, for a high $a_z$ value the threshold values will be increased, and for a decreasing $a_z$ value the threshold values will be decreased. This ensures that, when driving through the steep turn, there will be no triggering or activation of a safety device.

Figure 6:
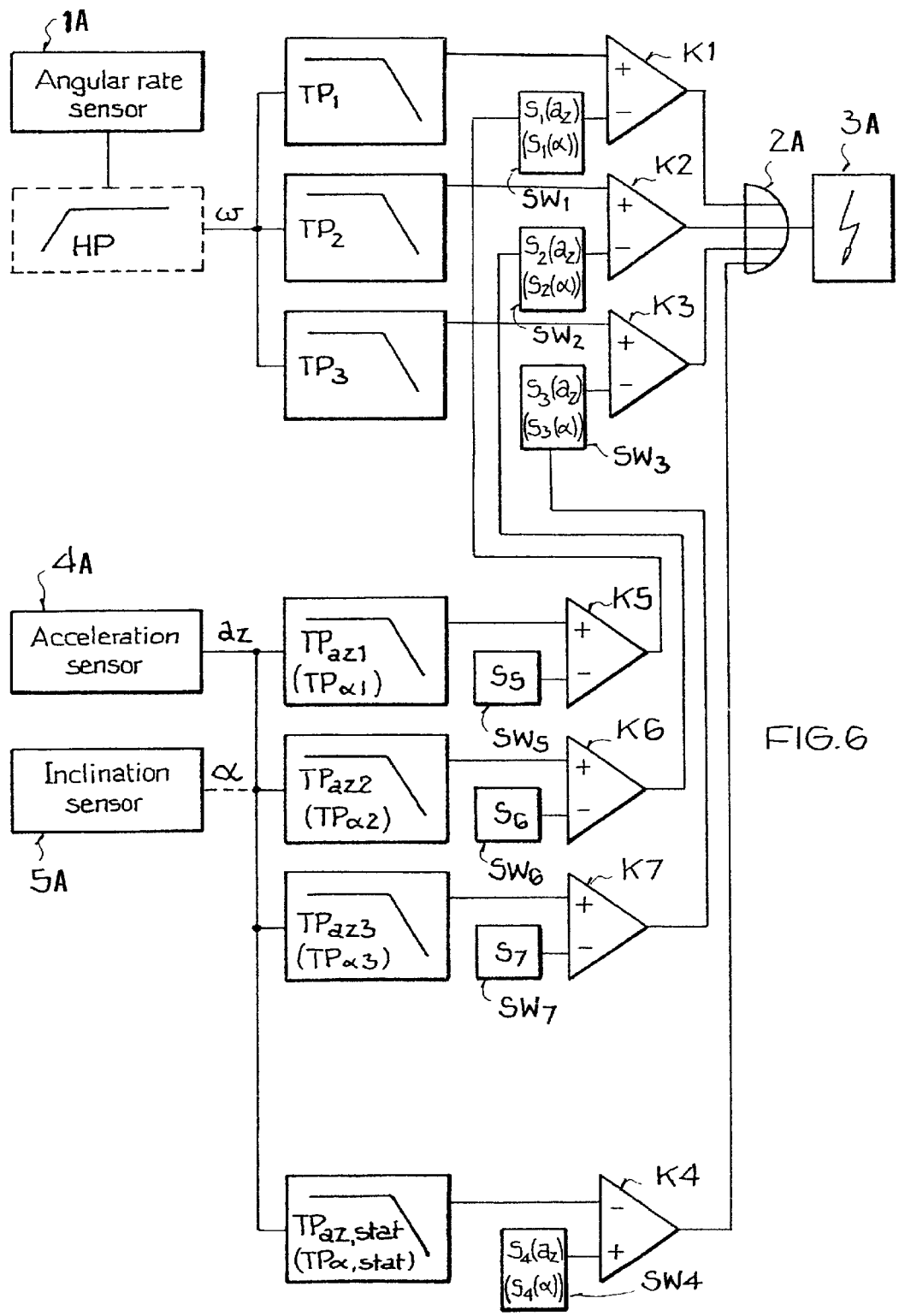
FIG. 6: an embodiment modified according to FIG. 5, FIG. 7: a flow chart for the software implementation of the embodiment according to FIG. 5, FIG. 8: a block diagram according to FIG. 1 with two additional acceleration transducers in z and y direction.

The safety system according to FIG. 6 shows a possible implementation of the dynamic threshold adaptation, with this safety system—in comparison with the system according to FIG. 5—featuring three low pass filters $TP_{azi}$, i=1,2,3 connected to an input of a respective threshold value circuit $SW_i$, i=1,2,3, instead of one low pass filter $TP_{az}$ connected to the threshold value circuits $SW_i$, i=1,2,3 as shown in FIG. 5. In FIG. 6 a comparator $K_5$, $K_6$ or $K_7$ with a respective threshold value circuit $SW_5$, $SW_6$ or $SW_7$ is connected respectively between a threshold value circuit $SW_i$, i=1,2,3 and a low pass filter $TP_{azi}$, i=1,2,3.

The algorithm to be implemented in the event of a software implementation of the safety system features—as an extended activating algorithm and in accordance with these three low pass filters $TP_{azi}$, i=1,2,3, the comparator $K_5$, $K_6$, $K_7$, and the respective threshold value circuits $SW_5$, $SW_6$, and $SW_7$—three additional low pass filter functions and respectively assigned threshold values $S_i$, i=5,6,7.

The cutoff frequencies of the low pass filters $TP_{azi}$, i=1,2,3 as well as the threshold values of $S_i$, i=5,6,7 of the comparators $K_i$, i=5,6,7 are different and determined such that in a downward sequence the first low pass filter $TP_{az1}$ features the highest cutoff frequency and the third low pass filter $TP_{az3}$ the lowest cutoff frequency. The same applies to the threshold values $S_i$, i=5,6,7 of the threshold value circuit $SW_5$, $SW_6$, $SW_7$. If the output signal of a low pass filter $TP_{azi}$ i=1,2,3 is lower than that of one of the threshold values $S_i$, i=5,6,7, then the trigger threshold $S_i$(az) i=1,2,3 of the respective respective threshold value circuit SWi i=1,2,3 is decreased by a predefined step; if the output signal of the respective low pass filter exceeds the threshold value again, then the trigger threshold will also be increased.

In order to increase the reliability of an activation in the event of a slow rollover, i.e. a so-called static rollover, it is possible to connect to the output of the acceleration sensor 4A an additional low pass filter $TP_{az,stat}$-shown in FIGS. 5 and 6 as an option together with a comparator $K_4$ and a threshold value circuit $SW_4$ or to implement the same in the extended activating or activation algorithm as a further low pass filter function with the low pass filter $TP_{azstat}$, the vibrations will initially be filtered from the acceleration signal $a_z$ and fed to the comparator $K_4$ at its inverting input. A threshold value circuit $SW_4$ generates a trigger threshold value $S_4$ corresponding to the static tip angle of the vehicle, which, when the actual filtered $a_z$-value drops below the trigger threshold value $S_4$, via a connection to OR gate 2A causes a safety device to be activated by the ignition stage 3A. This drop below the trigger threshold value is interpreted as the transition from a stable vehicle position, where the acceleration sensor 4A indicates a value around 1 g, into an unstable vehicle position marked by a low $a_z$ value of the acceleration sensor 4A. For the associated trigger threshold value $S_4$, a correspondingly low value will therefore be selected, 0.5 g for example.

Figure 7:
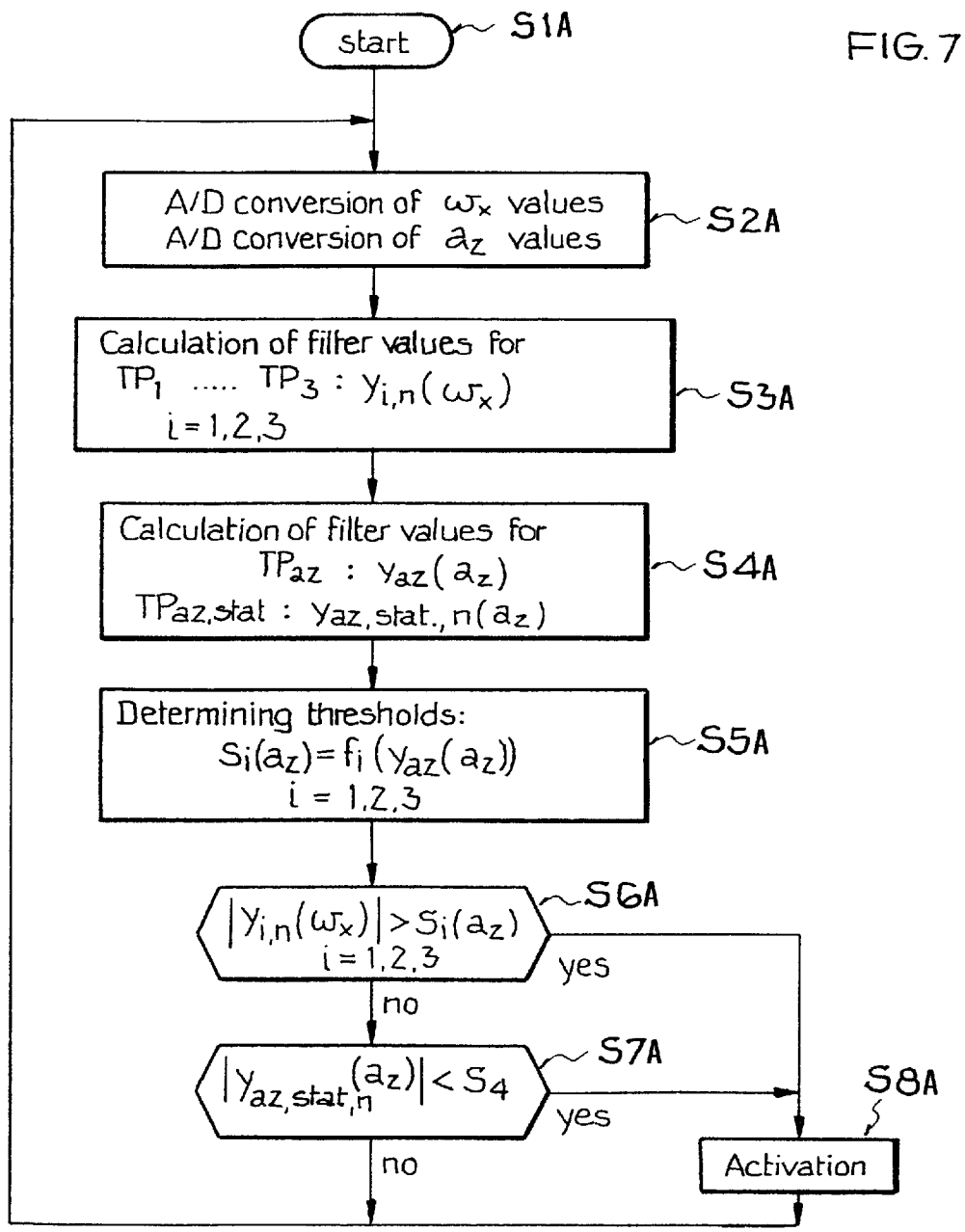

For the software implementation of the extended activating algorithm generated for the safety system according to FIG. 5, FIG. 7 shows a flow chart which essentially corresponds to that of FIG. 3. Starting step $S_1A$ and step $S_3A$ are the same as $ST_1$ and $ST_3$ in FIG. 3. The differences are only in that, additionally in step $S_2A$ the $a_z$ values are also digitized. In step $S_4A$ the corresponding filter values $z_1Fil_{out}$ are generated, and in relation to these filter values trigger threshold values, $S_i(a_z)$, (i=1,2,3) are set as a function $f_i(z1Fil_{out})$. Step S5A determines threshold values for $Si(a_z)$. The remaining steps S6A, S7A correspond to step ST4 and step S8A corresponds to step ST5 in FIG. 3.

In addition to the implementation of the tip angle detection by means of the low pass filter $TP_{az,stat}$, of comparator $K_4$ and the associated threshold value circuit $SW_4$, in step S4A the filter values $z_2Fil_{out}$ of filter $TP_{az,stat}$ are calculated, in order to carry out—subsequent to step S6A, if the trigger threshold values $S_i(a_z)$ (i=1,2,3) are not exceeded—a comparison of the filter values $z_2Fil_{out}$ with the trigger threshold value S4 corresponding to the static tip angle (step S7A).

Instead of the acceleration transducer 4A in the safety systems according to the FIGS. 5 and 6, an inclination sensor 5A can be used as shown by a dashed connection line to the low pass filters $TP_{\alpha i}$, $TP_{\alpha,stat}$ in FIG. 5, or to the low pass filters $TP_{\alpha i}$, i=5,6,7 in FIG. 6. Correspondingly, as described above, when the $\alpha$-values have been filtered by a low pass filter $TP_{\alpha 1}$ or $TP_{\alpha i}$, i=5,6,7 these values are used for the dynamic adaptation of the trigger threshold values $S_i(\alpha)$ (i=1,2,3). The advantage of this measure is that these $\alpha$ values provide additional information on the stability of the vehicle. It is assumed here that for appropriately large $\alpha$ values there is only a low driving stability, that is, the trigger threshold values need to be lowered, so that even for low $\omega_x$ values activation takes place. As the inclination sensor 5A also supplies the sign of the tip angle, the trigger threshold values can be adapted asymmetrically, that is, if the $\omega_x$ values of the angular rate and the $\alpha$ values have the same sign, then a lower trigger threshold value is set, whilst if the signs are different a high trigger threshold value is set.

Figure 8:
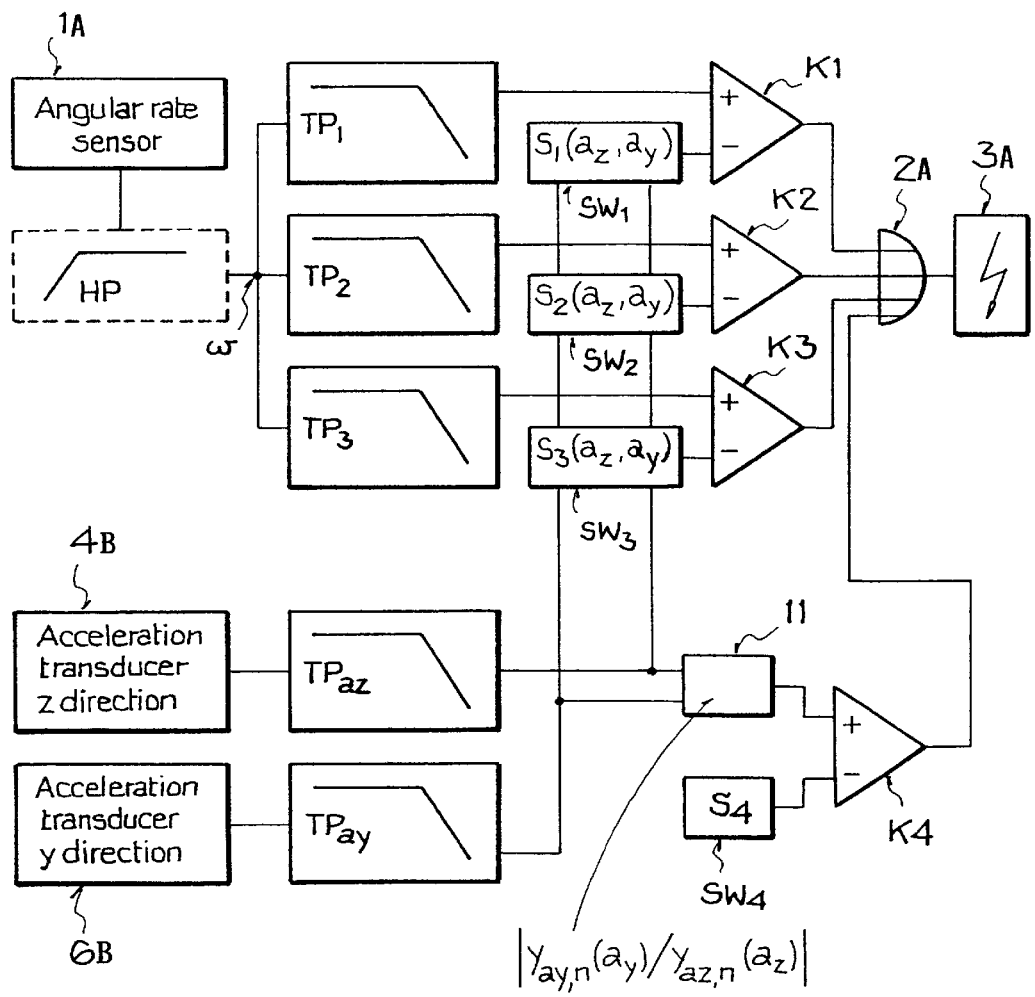

The dynamic adaptation of the trigger threshold values $S_i$ (i=1,2,3) can also be carried out, in accordance with FIG. 8, by means of the transverse and vertical acceleration values of the vehicle. Here, the DC capable acceleration sensor or transducer 4B for the z-direction and the DC capable acceleration sensor or transducer 6B for y-direction are preferably used. The output of sensor 4B is connected to a low pass filter $TP_{az}$. The output of the sensor 6B is connected to a low pass filter $TP_{ay}$. The functions of these filters are implemented in the processor of the control unit (CPU). Both acceleration values processed by the filter functions, that is the filtered $a_z$ and $a_y$, values are fed to the threshold value circuits $SW_i$ (i=1,2,3) for the dynamic adaptation of the trigger threshold values $S_i(a_z,a_y)$ (i=1,2,3), that is, they are set in relation to the filter function values $zFil_{out}$, and $yFil_{out}$, i=1,2,3. From these filtered acceleration values, it is possible to determine additionally the value and direction of acceleration, and thus, the inclination angle, for the corresponding adaptation of the trigger threshold values, as already described and shown above.

Furthermore, if DC capable acceleration sensors 4B, 6B are used, it is possible to evaluate the stability of the current vehicle condition by means of the lateral acceleration to vertical acceleration ratio. This is done, for example, by decreasing the trigger threshold values $S_i(a_z,a_y)(i=1,2,3)$. If this ratio has a high value it indicates an unstable vehicle condition. Furthermore, the sign of the lateral acceleration can be used to make the trigger threshold values dependent on the sign of the rotation direction of the vehicle rollover such that if the signs are equal a lower trigger threshold value is set than for different signs.

Finally, a calculating function that can be performed by a circuit arrangement 11 shown in FIG. 8 can be used to calculate the ratio of the $a_y/a_z$-values (as filter values) representing lateral to vertical acceleration. The calculated ratio can be used directly in the comparator K4 for comparing with the threshold value $S_4$ provided by the circuit $SW_4$ which generates the threshold value $S_4$ as a fixed trigger threshold for the activation of a safety device. As this ratio states the inclination angle of the vehicle, the fixed trigger threshold value $S_4$ can be set in line with the static tip angle $\alpha_{tip}$ of the vehicle.

The flow chart for the software implementation of the safety system according to FIG. 8, corresponds essentially to the embodiments described above and is therefore not shown.

Figure 9:
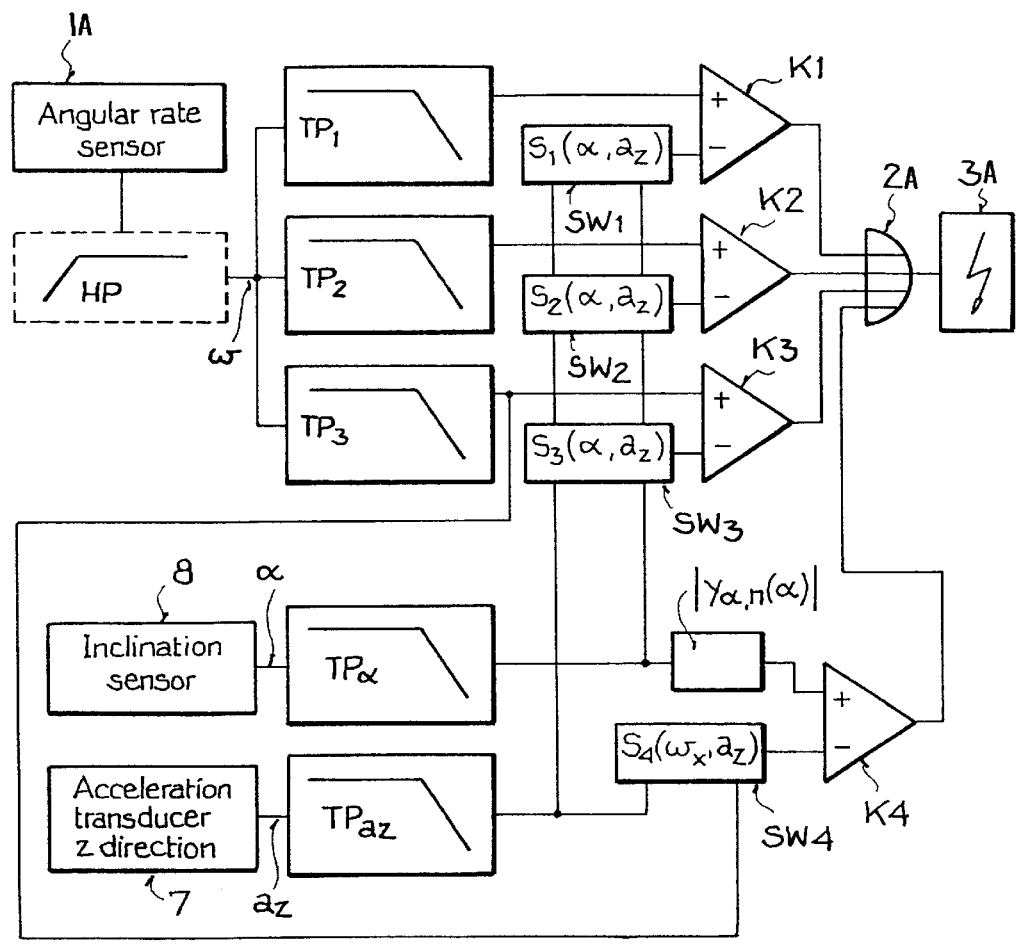
FIG. 9: a block diagram according to FIG. 1 with an additional inclination sensor in y direction and an additional acceleration transducer in z direction.

The embodiment of a safety system according to FIG. 9 represents a combination of the two alternatives shown in FIG. 5, where in addition to an angular rate sensor 1A an acceleration sensor or transducer 7 for the z-direction and an inclination sensor 8 for the y-direction are used. The dynamic adaptation of the trigger threshold values $S_i(\alpha;a_z)$ is effected relative to the $\alpha$-values of the inclination sensor 8 and to the $a_z$-values of the acceleration sensor 7, filtered by means of an appropriate low pass filter function $TP_\alpha$ and $TPa_z$ respectively, by increasing the trigger threshold values in the event of a high $a_z$-values, taking into account the direction information of the $\alpha$-value, and, in a reverse case, by decreasing the trigger threshold values for low $a_z$-values.

In order to implement a static trigger branch, the filtered $\alpha$-values will not only be fed to the threshold value circuits $SW_i(i=1,2,3)$ but their values are also applied to the non-inverting input of a further comparator $K_4$, through a threshold value circuit $SW_4$ connected to the inverting input of the comparator $K_4$. This threshold value circuit $SW_4$ generates a trigger threshold value $S_4(\omega,a_z)$ relative to the applied filtered $\omega$-values of the filter $TP_3$ and the $a_z$-values, which trigger threshold value is large for large $a_z$-values because such $a_z$-values indicate a stable vehicle condition. If the $\omega$-values increase, then the trigger threshold value can be increased even further, so that there will not even be an activation because such a situation also indicates a stable vehicle condition, e.g. a steep turn. For low $a_z$-values and at the same time high $\omega_x$-values, the trigger threshold value $S_4(\omega,a_z)$ is decreased, however.

Figure 10:
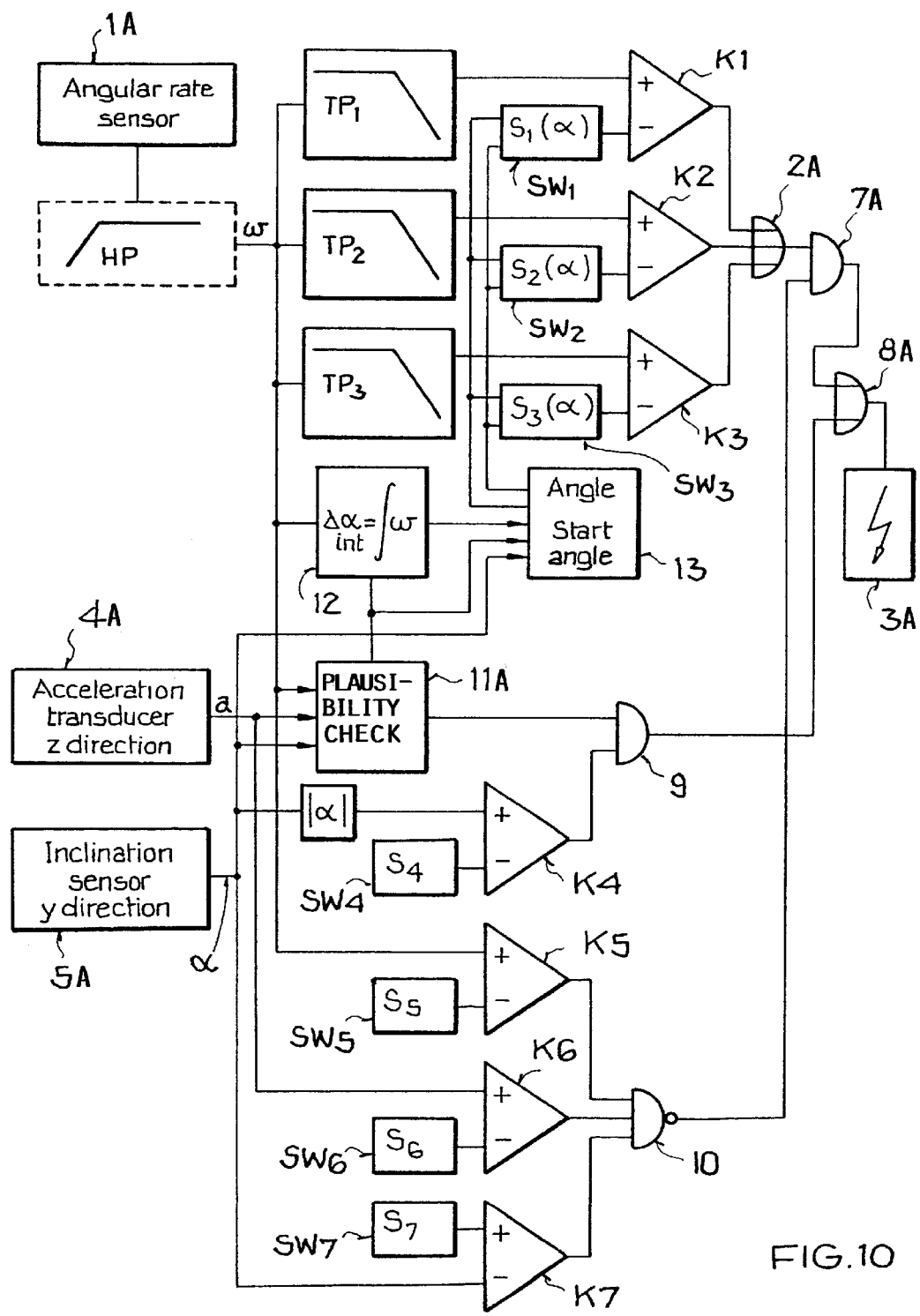
FIG. 10: a block diagram of an embodiment according to FIG. 8 where with regard to the sensor values of the inclination sensor a plausibility check is carried out.

The embodiment according to FIG. 10 differs from the embodiment described with reference to FIG. 9 essentially in that, additionally, the change of the inclination angle $\Delta\alpha_{int}=\int\omega_x dt$ during vehicle operation is calculated from the $\omega_x$-values by integration using an integrator circuit 12. The current inclination angle $\alpha_{curr}$ is determined on the basis of a change and of the start angle $\alpha_{start}$ representing a value at the start of the vehicle operation or a value set at the start of the activating or activation algorithm routine. The current inclination angle $\alpha_{curr}$ is then set in turn for the next routine as start angle $\alpha_{start}$.

The trigger threshold values $S_i(\alpha)$ will be dynamically adapted with regard to the start angle $\alpha_{start}$ whereby the direction of inclination can also be taken into account. For this purpose the angle values $\alpha_{start}$ are supplied to the threshold value circuits $SW_i(i=1,2,3)$ through an angle measurement circuit 13.

Furthermore, a plausibility unit 11A is provided which checks the $\alpha$-values generated by the inclination sensor 5A for their plausibility by means of the $\omega_x$-values supplied by the angular rate sensor 1A and the $a_z$-values supplied by the acceleration sensor 4A. The advantage of these measures is that, on the one hand, no-fire scenarios can be determined more easily, and, on the other hand, more precise information on the current inclination angle can be generated. Due to the plausibility check, an "incorrect" $\alpha$-value of the inclination sensor 5A can be detected so that an activation of the safety device in spite of a no-fire event can be excluded with a large degree of probability.

The risk of an "incorrect" $\alpha$-value being indicated is based on the physical principle of standard inclination sensors. Thus, there are sensors that indicate the level of a liquid and, for this reason, indicate correspondingly slowly, or for short and sharp acceleration events in their sensitivity direction, lead to a "spillover", i.e. the value indicated will be too large. If an acceleration sensor in the y-direction is used as an inclination sensor, the problem is that, if a filter is used to smooth the sensor signals, the system consisting of sensor and filter responds too slowly in the case of fast events. The aim, therefore, needs to be the elimination of the vibrations or superimposed on the actual useful signal.

Initially, the angle measurement unit 13 will define the current inclination angle $\alpha_{curr}$, obtaining at vehicle start up, as the start angle $\alpha_{start}$. Starting from this start angle $\alpha_{start}$ the current angle $\alpha_{curr}$ is calculated by the integration of the $\omega_x$ value using the integrator unit 12 and the addition of the start angle $\alpha_{start}$ in accordance with $\alpha_{start}+\Delta\alpha_{int}$.

With increasing time duration, however, the current inclination angle $\alpha_{curr}$ calculated by means of integration will deviate more and more from the actual inclination angle due to fault tolerances. Therefore, using plausibility unit 11, a plausibility check of the sensor values is carried out and the current actual inclination angle $\alpha_{curr}$ is correspondingly determined in relation to the result of the check carried out by the angle measurement unit 13.

Figure 11:
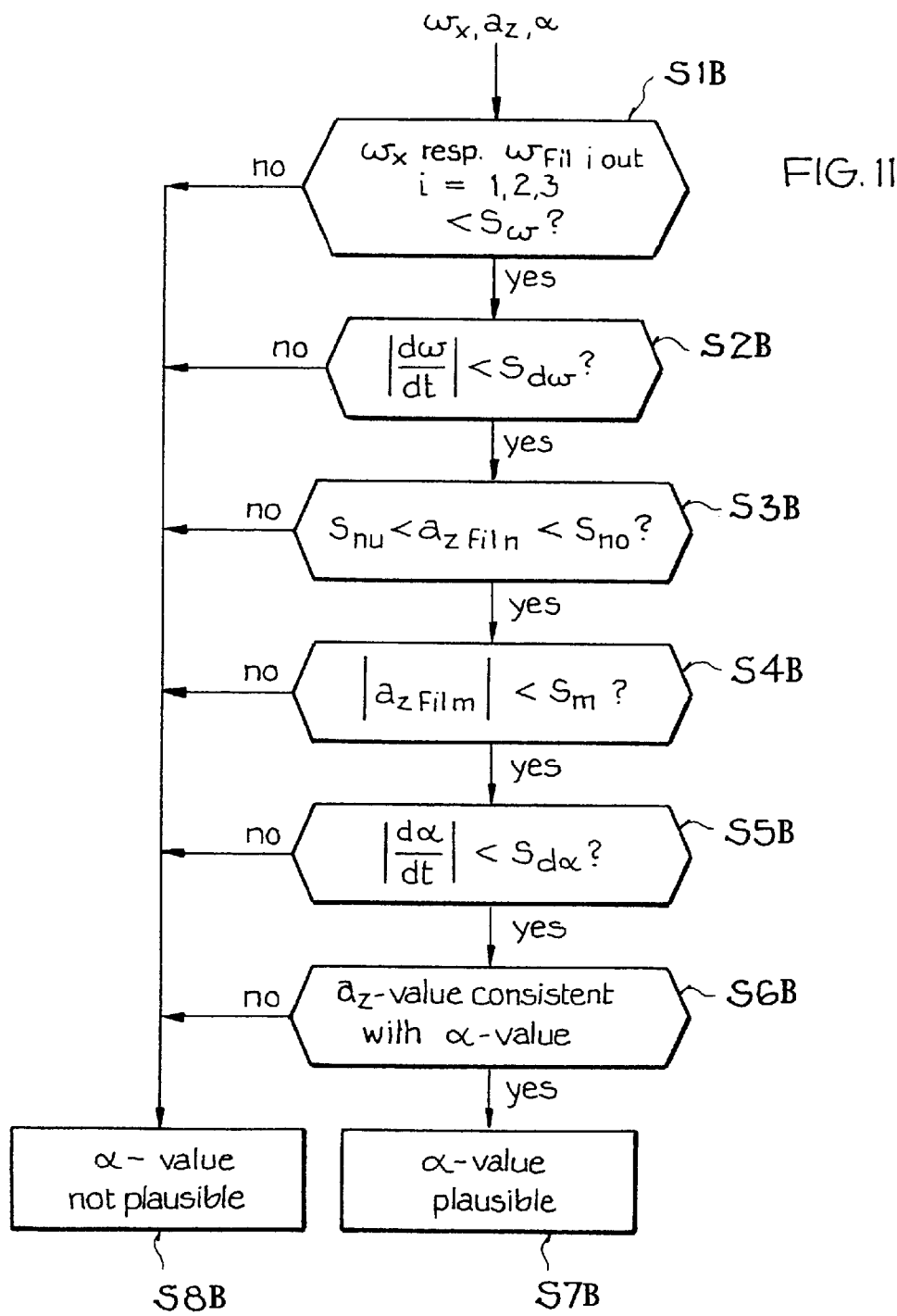
FIG. 11: a flow chart for the evaluation of the plausibility of the $\alpha$ value generated by an inclination sensor.

The conditions under which an $\alpha$-value is evaluated as being plausible are to be described by means of the flow chart shown in FIG. 11. Initially, the $\omega_x$ value must remain underneath a specified threshold $S_\omega$ in order to exclude the "incorrect" values occurring due to the inertia of the liquid existing in an inclination sensor or the inertia of the system "acceleration sensor in y-direction and filter" (step S1B).

According to step S2B the change speed of the $\omega_x$-value must not exceed a specified threshold $S_{d\omega}$. If this threshold is exceeded, this means that forces act on the liquid existing in an inclination sensor that may lead to an "incorrect" $\alpha$-value.

According to step S3B the $a_z$-values filtered with a long term filter having a large time constant must only be within a value range about the value 1 g, which range is specified by an upper threshold $S_{no}$ and a lower threshold $S_{nu}$, for example between 0.7 g and 1.3 g. Only in this case will there be a stable vehicle condition such that the inclination sensor is also able to supply a "correct value".

The condition according to step S4B is used to check whether the vehicle is being driven across a bumpy track. To this end, the $a_z$ values are filtered with a short term filter having a small time constant and the amount of these filtered values is compared with a threshold $S_m$. If this threshold is exceeded, this means that there is a bumpy track such that the inclination sensor could supply "incorrect" values.

In step S5B it is additionally checked whether the speed of change of the α-value, which is measured relative to a threshold $S_{d\alpha}$, is not too high, because in such a case forces act on the vehicle that cause the inclination sensor liquid to wobble; with the consequence that "incorrect" values are generated.

Finally, it will be checked whether the α-value is consistent with the $a_z$-value measured by the acceleration sensor in the z-direction, as the last-mentioned value $a_z$ must approximately correspond to cos α.

If all conditions mentioned in steps S1B to S6B are met, then the relevant α-value will be evaluated to be plausible (step S7B). However, if one of these conditions is not met, then the α-value will evaluated as being not plausible (step S8B).

An α-value that has been evaluated as plausible will be set as the current value $\alpha_{curr}$ and as the start angle $\alpha_{start}=\alpha_{curr}$. When the extended activating algorithm has been run through, $\alpha_{start}$ defines the start angle "old" according to $\alpha_{start,old}=\alpha_{start}$. If an α-value is detected as not being plausible, then the current angle $\alpha_{curr}$ is yielded by $\alpha_{start,old}+\Delta\alpha_{int}$ and the start angle "new" as $\alpha_{start}=\alpha_{curr}$. Before a new routine is started, $\alpha_{start,old}=\alpha_{start}$ is again reset.

If the α-value most recently detected as being plausible lies too far back in time, then the increased trigger threshold values $S_i(\alpha)$, i=1,2,3 can either be reset in several stages to their basic values, or reset immediately to these basic values.

In order to detect driving situations where an activation is not desired, the function branch formed by the comparators $K_5$, $K_6$, and $K_7$, a NAND gate 10, and an AND gate 7A is used to detect a steep turn. The comparators $K_5$, $K_6$, and $K_7$ are respectively assigned to a threshold value circuit $SW_i$ (for i=5,6,7) for generating a threshold value $S_i$, with the $\omega_x$-value generated; by the angular rate sensor 1A being fed—for comparison with the threshold value $S_5$—to the comparator $K_5$, and the $a_z$-value generated by the acceleration sensor 4A in the z-direction to the comparator $K_6$, and the α-value generated by the inclination sensor 5A to the comparator $K_7$. If the threshold values $S_i$(i=5,6) are exceeded by the respective measured values, whilst at the same time the actual α-value drops below the threshold value $S_7$, a logical L-value is applied at the output of the NAND gate 10, which blocks the AND gate 7A such that an H-signal applied at the other input of this AND gate 7A does not cause, an activation of a safety device through the OR gate 8 and the ignition stage 3A.

Activation is to be prevented in all cases where, for example, the vehicle drives through a steep turn, as otherwise the high $\omega_x$ value which occurs during such an event would cause the safety device to be activated. The threshold value $S_5$ is set such that the $\omega_x$-value which occurs when driving through a steep turn is exceeded. In addition, an $a_z$-value occurs in such a driving situation which is significantly above the value of 1 g, which is why the corresponding threshold value $S_6$ is set to approximately 1 g. When driving through the steep turn, due to the super-elevation of the road surface and the centrifugal acceleration occurring with the use of a liquid inclination sensor, however, the α-value will deviate only a little from 0°, that is, it will remain below a specific value. Therefore the α-value will be fed to the inverting input, and the threshold value $S_7$ will be fed to the non-inverting input of the comparator $K_7$.

If very slow rollovers occur where the trigger threshold values $S_i(\alpha)$ (for i=1,2,3) are not exceeded, then—for activating the safety device—the α-value amount which occurs will be compared by means of the comparator $K_4$ with a trigger threshold value $S_4$ corresponding to the static tip angle of the vehicle and generated by the threshold value circuit $SW_4$. If this trigger threshold value $S_4$ is exceeded, an activation will be effected only if the corresponding α-value has been evaluated as plausible by the plausibility unit 11, so that in consequence a H-signal is applied at both inputs of the AND gate 9, thus activating the ignition stage 3.

What is claimed is:

1. A method for generating an activating algorithm for processing a sensor signal of an angular rate sensor provided within a safety system of a motor vehicle, by means of which an activation decision for activating at least one safety device of said safety system is made in response to said sensor signal, wherein said sensor signal represents a measure of a rotational velocity (ω) of a rolling motion occurring when a rollover is imminent, said method comprising the following steps:

a) generating a theoretical characteristic rollover curve satisfying:

$$\alpha_{th}(\omega)=-(\alpha_{tip}/\omega_{lim})\omega+\alpha_{tip}, \omega \geq 0 \qquad \text{Equation (1)}$$

where ω corresponds to the initial rotational velocity of a rolling motion of said motor vehicle, and $\alpha_{th}(\omega)$ represents an inclination angle of said motor vehicle, wherein the constants $\alpha_{tip}$ and $\omega_{lim}$ are determined based on said motor vehicle, said constants defining a static motor vehicle tip angle limit which—if exceeded—causes the motor vehicle to tip over, said constants further defining a rotational velocity range within which a vehicle rollover will occur in response to $\omega \geq \omega_{lim}$, and wherein a rollover risk range $B_{th}$ is represented by (ω,α) value pairs, thus $|\alpha| \geq \alpha_{th}(|\omega|)$ wherein α and ω are real values, wherein a positive activation decision for activating said at least one safety device is expected, and b) generating an activation algorithm by approximating said theoretical characteristic rollover curve of Equation (1) in the first quadrant with at least first and second low pass filter functions ($Y_{1,n}$, n=1,2, . . . ; $Y_{2,n}$, n=1,2, . . . ) to produce at least one approximated rollover curve (1'), wherein each low pass filter function has at least one respective activation threshold ($S_1$, $S_2$), wherein cutoff frequencies ($f_{g1}$, $f_{g2}$) of said at least first and second low pass filter functions ($Y_{1,n}$, n=1,2, . . . ; $Y_{2,n}$, n=1,2, . . . ) and said activation thresholds ($S_1$, $S_2$) are so determined that for a range $B_{F1}$ of (|ω|, $Y_{1,n}(\omega)$) value pairs and for a range $B_{F2}$ of (|ω|, $Y_{2,n}(\omega)$) value pairs $|Y_{1,n}(\omega)|>S_1$, and $|Y_{2,n}(\omega)|>S_2$ is satisfied wherein $Y_{1,n}(\omega)$ and $Y_{2,n}(\omega)$ are real values, and $B_{F1} \subset B_{th}$ and
$B_{F2} \subset B_{th}$ applies  Equation (2).

2. The method according to claim 1, further comprising determining output sequences of a time-dependent step function ω(t) for approximating said theoretical characteristic rollover curve through said first and second low pass filter functions ($Y_{1,n}$, n=1,2, . . . ; $Y_{2,n}$, n=1,2, . . . ) and the respective activation thresholds ($S_1$, $S_2$) to produce approximated rollover curves, and comparing said approximated rollover curves with said theoretical characteristic rollover curve of Equation (1).

3. The method of claim 2, further comprising adapting at least one of said cutoff frequencies ($f_{g1}$, $f_{g2}$) and/or at least one of said activation thresholds ($S_1$, $S_2$) to at least one of said first and/or second low pass filter functions ($Y_{1,n}$, n=1,2, . . . ; $Y_{2,n}$, n=1,2, . . . ).

4. The method of claim 1, further comprising processing simulated and/or actual sensor signals in a processing unit for approximating said theoretical characteristic rollover curve through said first and second low pass filter functions ($Y_{1,n}$, n=1,2, . . . ; $Y_{2,n}$, n=1,2, . . . ) and through respective activation thresholds ($S_1$, $S_2$) to produce approximated rollover curves.

5. The method of claim 4, further comprising adapting at least one of said cutoff frequencies ($f_{g1}$; $f_{g2}$) and/or at least one of said activation thresholds to at least one of said first and/or second low pass filter functions ($Y_{1,n}$, n=1,2, . . . ; $Y_{2,n}$, n=1,2, . . . ) in response to activating decisions made by said activation algorithm.

6. The method of claim 1, further comprising generating said first and second low pass filter functions ($Y_{1,n}$, n=1,2, . . . ; $Y_{2,n}$, n=1,2, . . . ) as digital filters of the first magnitude.

7. The method according to claim 4, further comprising generating a high pass filter function (HP) and processing said simulated and/or actual sensor signals through said high pass filter function (HP) prior to further processing said simulated and/or actual sensor signals.

8. The method of claim 7, further comprising performing said processing and said further processing in a programmable data processing unit.

9. The method of claim 1, further comprising processing with said activation algorithm further sensor signals including, in addition to angular rate signals, vertical acceleration sensor signals, lateral acceleration sensor signals and inclination angle sensor signals for providing vehicle condition specific parameters, adapting said activation thresholds ($S_1$; $S_2$) in response to said vehicle condition specific parameters by generating at least one further low pass filter function ($Y_{az,n}$, $Y_{ay,n}$, $Y_{a,n}$, n=1,2,3, . . . ) for each of said further sensor signals, extending said activation algorithm by said at least one further low pass filter function to form an extended activation algorithm, using a respective further limit frequency $f_{g,az}$, $f_{g,ay}$, $f_{g,a}$), and increasing or decreasing said activation thresholds ($S_1$, $S_2$) in accordance with said vehicle condition specific parameters.

10. The method of claim 9, further comprising simulating and evaluating said extended activation algorithm with the aid of real and/or simulated sensor signals corresponding to said further sensor signals wherein said evaluating is based on an activation decision made by said extended activation algorithm, and increasing or decreasing said cutoff frequencies and/or said activation thresholds ($S_1$, $S_2$) based on said evaluating.

11. The method of claim 9, further comprising generating said first and second low pass filter functions ($Y_{1,n}$, n=1,2, . . . ; $Y_{2,n}$, n=1,2, . . . ) as digital filters of the first magnitude.

12. The method according to claim 9, further comprising generating a high pass filter function (HP) and processing said simulated and/or actual sensor signals through said high pass filter function (HP) prior to further processing said simulated and/or actual sensor signals.

13. The method of claim 12, further comprising performing said processing and said further processing in a programmable data processing unit.

14. A safety system for a motor vehicle, said safety system comprising: an angular rate sensor for sensing a rotational velocity of a rolling motion of a motor vehicle, a safety device responsive to control signals provided by a control unit of aid safety system, said control unit generating an activation algorithm as defined in claim 1, wherein said second low pass filter function ($Y_2$, n) has said cutoff frequency ($f_{g2}$) that is smaller than the cutoff frequency ($f_{g1}$) of said first low pass filter function, thus ($f_{g2}<f_{g1}$), and wherein said at least one activation threshold (S2) of said second low pass filter function is smaller than said at least one activation threshold (S1) of said first low pass filter function, thus (S2<s1), and wherein said control unit activates said safety device in response to any one of said value pairs exceeding said activation thresholds (S1, S2), thus $|Y_{1,n}(\omega)|<S_1$, and $|Y_{2,n}(\omega)|<S_2$ of said low pass filter functions.

15. The safety system of claim 14, wherein said second cutoff frequency ($f_{g2}$) of said second low pass filter function ($Y_{2,n}$) is less than 5 Hz, and wherein said activation threshold ($S_2$) is adapted to said second cutoff frequency ($f_{g2}$) for detecting a slow rollover of said motor vehicle.

16. The system of claim 14, wherein said first cutoff frequency ($f_{g1}$) of said first low pass filter ($Y_{1,n}$) is less than 10 Hz and said first activation threshold ($S_1$) is adapted to said first cutoff frequency ($f_{g1}$) for detecting a vehicle rollover with a first rotational velocity, and wherein said second cutoff frequency ($f_{g2}$) of said second low pass filter function ($Y_{2,n}$) is less than 5 Hz and a second activation threshold (S2) adapted to said second cutoff frequency for detecting a vehicle rollover with a second rotational velocity which is lower than said first rotational velocity.

17. The system of claim 14, further comprising a third low pass filter function ($Y_{3,n}$) with a third cutoff frequency ($f_{g3}$) smaller than 1 Hz and a third activation threshold ($S_3$) adapted to said third cutoff frequency for detecting a slow vehicle rollover.

18. A safety system for a motor vehicle, said safety system comprising an angular rate sensor for sensing a rotational velocity of a rolling motion of said motor vehicle, a safety device responsive to control signals provided by a control unit of said safety system, said control unit generating an activation algorithm as defined in claim 2, wherein said second low pass filter function ($Y_{2,n}$) has said cutoff frequency ($f_{g2}$) that is smaller than the cutoff frequency ($f_{g1}$) of said first low pass filter function, thus ($f_{g2}<f_{g1}$), and wherein said at least one activation threshold ($S_2$) of said second low pass filter function is smaller than said at least one activation threshold ($S_1$) of said first low pass filter function, thus ($S_2<S_1$), and wherein said control unit activates said safety device in response to any one of said value pairs exceeding said activation thresholds ($S_1$, $S_2$), thus $|Y_{1,n}(\omega)|>S_1$, and $|Y_{2,n}(\omega)|>S_2$ of said low pass filter functions.

19. The safety system of claim 18, wherein said second cutoff frequency ($f_{g2}$) of said second low pass filter function ($Y_{2,n}$) is less than 5 Hz and wherein said activation threshold ($S_2$) is adapted to said second cutoff frequency ($f_{g2}$) for detecting a slow rollover of said motor vehicle.

20. The system of claim 18, wherein first cutoff frequency ($f_{g1}$) of said first low pass filter ($Y_{1,n}$) is less than 10 Hz and said first activation threshold ($S_1$) adapted to said first cutoff frequency ($f_{g1}$) for detecting a vehicle rollover with a first rotational velocity, and wherein second cutoff frequency ($f_{g2}$) of said second low pass filter function ($Y_{2,n}$) is less than 5 Hz and a second activation threshold ($S_2$) adapted to said second cutoff frequency for detecting a vehicle rollover with a second rotational velocity lower than said first initial rotational velocity.

21. The system of claim 18 further comprising a third low pass filter function ($Y_{3,n}$) with a third cutoff frequency ($f_{g3}$) smaller than 1 Hz and a third activation threshold ($S_3$) adapted to said third cutoff frequency for detecting a slow vehicle rollover.

22. A safety system for a motor vehicle, said safety system comprising an angular rate sensor for sensing a rotational velocity of a rolling motion of said motor vehicle, a safety device responsive to control signals provided by a control unit of said safety system, said control unit generating an activation algorithm as defined in claim 4, wherein said second low pass filter function ($Y_{2,n}$) has said cutoff frequency ($f_{g2}$) that is smaller than the cutoff frequency ($f_{g1}$) of said first low pass filter function, thus ($f_{g2}<f_{g1}$), and wherein said at least one activation threshold ($S_2$) of said second low pass filter function is smaller than said at least one activation threshold ($S_1$) of said first low pass filter function, thus ($S_2<S_1$), and wherein said control unit activates said safety device in response to any one of said value pairs exceeding said activation thresholds ($S_1$, $S_2$), thus $|Y_{1,n}(\omega)|>S_1$, and $|Y_{2,n}(\omega)|>S_2$ of said low pass filter functions.

23. The safety system of claim 22, wherein said second cutoff frequency ($f_{g2}$) of said second low pass filter function ($Y_{2,n}$) is less than 5 Hz and wherein said activation threshold (S2) is adapted to said second cutoff frequency ($f_{g2}$) for detecting a slow rollover of said motor vehicle.

24. The system of claim 22, wherein first cutoff frequency ($f_{g1}$) of said first low pass filter ($Y_{1,n}$) is less than 10 Hz and said first activation threshold ($S_1$) adapted to said first cutoff frequency ($f_{g1}$) for detecting a vehicle rollover with a first rotational velocity, and wherein second cutoff frequency ($f_{g2}$) of said second low pass filter function ($Y_{2,n}$) is less than 5 Hz and a second activation threshold ($S_2$) adapted to said second cutoff frequency for detecting a vehicle rollover with a second rotational velocity lower than said first initial rotational velocity.

25. The system of claim 22, further comprising a third low pass filter function ($Y_{3,n}$) with a third cutoff frequency ($f_{g3}$) smaller than 1 Hz and a third activation threshold ($S_3$) adapted to said third cutoff frequency for detecting a slow vehicle rollover.

26. A safety system for a motor vehicle, said safety system comprising an angular rate sensor for sensing a rotational velocity of a rolling motion of said motor vehicle, a safety device responsive to control signals provided by a control unit of said safety system, said control unit generating an activation algorithm as defined in claim 9, wherein said second low pass filter function ($Y_{2,n}$) has said cutoff frequency ($f_{g2}$) that is smaller than the cutoff frequency ($f_{g1}$) of said first low pass filter function, thus ($f_{g2}<f_{g1}$), and wherein said at least one activation threshold ($S_2$) of said second low pass filter function is smaller than said at least one activation threshold ($S_1$) of said first low pass filter function, thus ($S_2<S_1$), and wherein said control unit activates said safety device in response to any one of said value pairs exceeding said activation thresholds ($S_1$, $S_2$), thus $|Y_{1,n}(\omega)|>S_1$, and $|Y_{2,n}(\omega)|>S_2$ of said low pass filter functions.

27. The safety system of claim 24, wherein said second cutoff frequency ($f_{g2}$) of said second low pass filter function ($Y_{2,n}$) is less than 5 Hz and wherein said activation threshold ($S_2$) is adapted to said second cutoff frequency ($f_{g2}$) for detecting a slow rollover of said motor vehicle.

28. The system of claim 26, wherein first cutoff frequency ($f_{g1}$) of said first low pass filter ($Y_{1,n}$) is less than 10 Hz and said first activation threshold ($S_1$) adapted to said first cutoff frequency ($f_{g1}$) for detecting a vehicle rollover with a first rotational velocity, and wherein second cutoff frequency ($f_{g2}$) of said second low pass filter function ($Y_{2,n}$) is less than 5 Hz and a second activation threshold ($S_2$) adapted to said second cutoff frequency for detecting a vehicle rollover with a second rotational velocity lower than said first initial rotational velocity.

29. The system of claim 26, further comprising a third low pass filter function ($Y_{3,n}$) with a third cutoff frequency ($f_{g3}$) smaller than 1 Hz and a third activation threshold ($S_3$) adapted to said third cutoff frequency for detecting a slow vehicle rollover.

30. The system of claim 26, further comprising a vertical acceleration sensor for detecting vertical acceleration signals of said motor vehicle, and wherein said vertical acceleration signals are processed by said extended activation algorithm and compared with at least one adapted activation threshold ($S_{az}$) and, if an actual value of said vertical acceleration signals exceeds or drops below said adapted activation threshold ($S_{az}$), the threshold values ($S_i$, i=1,2,3) of said adapted activation thresholds are either increased or decreased, respectively.

31. The safety system of claim 24, further comprising an inclination sensor for detecting inclination signals of said motor vehicle, and wherein said inclination signals are processed by said extended activation algorithm and compared with at least one adapted activation threshold (S$\alpha$) and, if an actual value of said inclination signals exceeds or drops below said adapted activation threshold (S$\alpha$), the threshold values ($S_i$, i=1,2,3) of said adapted activation thresholds are either increased or decreased, respectively.

32. The safety system of claim 26, further comprising lateral acceleration sensors for detecting vertical acceleration ($a_z$) and lateral acceleration signals ($a_y$) of said motor vehicle, and wherein said lateral acceleration signals are respectively processed by said extended activation algorithm to form a quotient ($a_y/a_z$) value which is compared with a quotient threshold ($S_{quot}$) for activating said safety device if said quotient ($a_y/a_z$) is either larger or smaller than said quotient threshold ($S_{quot}$) with regard to whether said lateral acceleration signals are positive or negative.

33. The safety system of claim 26, further comprising a vertical acceleration sensor for detecting a vertical acceleration ($a_z$), and an inclination angle detector for detecting an inclination angle ($\alpha$) of said motor vehicle, and wherein, in order to take into account a vehicle condition corresponding to vertical acceleration signals and inclination signals detected by said vertical acceleration sensor and said inclination angle detector, respectively, the respective vertical acceleration signals and inclination signals are processed by said extended activation algorithm to determine a current vehicle condition, and wherein activation threshold values ($S_i(a,a_z)$, i=1,2,3) are adapted to said current vehicle condition.

34. The safety system of claim 33, wherein a tip threshold value ($S_4(\omega,\alpha_z)$) is determined in accordance with said vertical acceleration signals, and said inclination or angular rate signals by processing said signals by the extended activation algorithm, and activating said safety device, if said inclination signal processed by said extended activating algorithm exceeds said tip threshold value ($S_4(\omega,\alpha_z)$).

35. The safety system of claim 26, further comprising a vertical acceleration sensor for detecting a vertical acceleration ($a_z$) and an inclination sensor for detecting an inclination angle ($\alpha$) of said motor vehicle, and wherein a plausibility of a value ($\alpha$) of said inclination angle is elevated by means of a vehicle condition characterizing said vertical acceleration ($a_z$) and a rotational velocity ($\omega$), and wherein, if said value (a) is plausible, said plausible value ($\alpha$) is set as a current value ($\alpha_{curr}$) of said inclination angle.

36. The safety system of claim 35, wherein the current inclination angle value ($\alpha_{curr}$) is compared with a tip threshold value ($S_{tip}$) corresponding to a tip angle ($\alpha_{tip}$) of said motor vehicle, and the safety device is activated, if said current value ($\alpha_{curr}$) of the inclination angle falls below said tip threshold value ($S_{tip}$).

37. The safety system of claim 36, wherein if the available inclination angle value ($\alpha$) is not plausible, a change ($\Delta\alpha_{int}$)

in the inclination angle which occurs during motor vehicle operation, is determined by means of an integration of the rotational velocity ($\omega$), and then said change ($\Delta\alpha_{int}$) is added to a start angle ($\alpha_{start}$); and the sum is then set as the current inclination angle ($\alpha_{curr}$).

38. The safety system of claim 37, wherein, in dependence of the preset current inclination angle value ($\alpha_{curr}$), activation threshold values ($Si(\alpha)$, i=1,2,3) are adapted to the current vehicle condition.

* * * * *

UNITED STATES PATENT AND TRADEMARK OFFICE
CERTIFICATE OF CORRECTION

PATENT NO. : 6,701,276 B2
DATED : March 2, 2004
INVENTOR(S) : Kueblbeck et al.

It is certified that error appears in the above-identified patent and that said Letters Patent is hereby corrected as shown below:

Column 2,
Line 18, after "range", replace "$B_{F2}$" by -- $B_{F1}$ --.

Column 4,
Line 11, after "system.", delete "< <";
Line 26, after "whilst", replace "the. The" by -- the --.

Column 7,
Line 30, after "triggering", replace "ranch" by -- branch --.

Column 8,
Line 42, before "by", replace "$a_x$-values" by -- $a_z$-values --;
Line 52, before "value", replace "$a_x$" by -- $a_z$ --.

Column 9,
Line 48, after "threshold", replace "$S_i(az)$" by -- $S_i(a_z)$ --;
Line 49, before "threshold", replace "respective respective" by -- respective --;
Line 60, after "filter" ($2^{nd}$ occurrence), replace "$TP_{azstat}$," by -- $TP_{az,stat}$ --.

Column 10,
Line 30, after "filters", replace "$TP_{ai}$" by -- $TP_{a1}$ --.

Column 11,
Line 46, after "filtered", replace "$\omega$-values" by -- $\omega_x$-values --;
Line 49, before "increase,", replace "$\omega$-values" by -- $\omega_x$-values --.

Column 15,
Line 53, after "said" ($1^{st}$ occurrence), replace "simulated and/or actual", by -- real and/or simulated --;
Line 55, before "sensor", replace "simulated and/or actual", by -- real and/or simulated --;
Line 63, after "of", replace "aid" by -- said --.

Column 16,
Line 7, before "of", replace "$|Y_{1,n}(\omega)| < S_1$, and $|Y_{2,n}(\omega)| < S_2$" by -- $|Y_{1,n}(\omega)| > S_1$, and $|Y_{2,n}(\omega)| > S_2$ --;
Lines 14 and 50, after "The", insert -- safety --;
Line 21, after "threshold", replace "(S2)" by -- $(S_2)$ --;
Line 24, after "The", insert -- safety --, after "claim", replace "14," by -- 16, --;
Line 60, after "The", insert -- safety --, after "18", insert -- , --.

UNITED STATES PATENT AND TRADEMARK OFFICE
CERTIFICATE OF CORRECTION

PATENT NO. : 6,701,276 B2
DATED : March 2, 2004
INVENTOR(S) : Kueblbeck et al.

It is certified that error appears in the above-identified patent and that said Letters Patent is hereby corrected as shown below:

Column 17,
Line 17, before "is", replace "(S2)" by -- ($S_2$) --;
Lines 19, 29, 55 and 65, after "The", insert -- safety --;
Line 63, after "first", delete "initial".

Column 18,
Line 3, after "The", insert -- safety --;
Line 12, after "claim", replace "24," by -- 26, --;
Line 54, after "angle", delete "(α)";
Line 58, after "value", replace "(a)" by -- (α) --, after "said", delete "plausible";
Line 60, after "wherein", replace "the" by -- said --;
Line 61, before "value", delete "inclination angle", before "is", insert -- of said inclination angle --;
Line 64, after "of", replace "the" by -- said --.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,701,276 B2
DATED : March 2, 2004
INVENTOR(S) : Kueblbeck et al.

It is certified that error appears in the above-identified patent and that said Letters Patent is hereby corrected as shown below:

Column 15,
Line 51, after "method", replace "according to claim 9" by -- of claim 10 --.

Signed and Sealed this

Fifth Day of April, 2005

JON W. DUDAS
*Director of the United States Patent and Trademark Office*